(12) United States Patent
Kono (10) Patent No.: US 8,958,664 B2
(45) Date of Patent: Feb. 17, 2015

(54) SEMICONDUCTOR OPTICAL MODULATOR (71) Applicant: Sumitomo Electric Industries, Ltd., Osaka-shi, Osaka (JP)

(72) Inventor: Naoya Kono, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 166 days.

(21) Appl. No.: 13/775,391

(22) Filed: Feb. 25, 2013

(65) Prior Publication Data
US 2013/0230268 A1 Sep. 5, 2013

(30) Foreign Application Priority Data

Mar. 2, 2012 (JP) .................. 2012-047031

(51) Int. Cl.
*G02F 1/035* (2006.01)
*G02B 6/12* (2006.01)
*G02B 6/10* (2006.01)
*G02B 6/00* (2006.01)
*G02F 1/01* (2006.01)
*G02F 1/017* (2006.01)
*G02F 1/313* (2006.01)

(52) U.S. Cl.
CPC ............. *G02F 1/011* (2013.01); *G02F 1/017* (2013.01); *G02F 1/3136* (2013.01); *G02F 2001/01733* (2013.01)
USPC ................ 385/2; 385/14; 385/131; 385/142; 257/E33.001

(58) Field of Classification Search
USPC .................. 385/1–3, 14, 129–132, 141–144; 257/E33.001
See application file for complete search history.

(56) References Cited

U.S. PATENT DOCUMENTS 7,437,029 B2 * 10/2008 Joyner et al. ............... 385/14
8,300,991 B2 * 10/2012 Kato ......................... 385/3

OTHER PUBLICATIONS

Naoto Yoshimoto, et al., "Design and Demonstration of Polarization-Insensitive Mach-Zender Switch Using a Lattice-Matched InGaAlAs/InAlAs MQW and Deep-Etched High-Mesa Waveguide Structure", Journal of Lightwave Technology, vol. 17, No. 9, Sep. 1999, pp. 1662-1669.

* cited by examiner

*Primary Examiner* — Akm Enayet Ullah
*Assistant Examiner* — Michael Mooney
(74) *Attorney, Agent, or Firm* — Smith, Gambrell & Russell LLP (57) ABSTRACT

A semiconductor optical modulator includes a substrate; and a mesa portion having a first cladding layer disposed on the substrate, a core layer disposed on the first cladding layer, and a second cladding layer disposed on the core layer, the first cladding layer having a first conductivity type, the second cladding layer having a second conductivity type reverse to the first conductivity type. The core layer includes a first multi quantum well structure made from a first conductivity type semiconductor layer and a second multi quantum well structure made from an i-type semiconductor layer in which no impurity is intentionally doped. The second multi quantum well structure is disposed on the first cladding layer. The first multi quantum well structure is disposed on the second multi quantum well structure. The second cladding layer is disposed on the first multi quantum well structure.

15 Claims, 9 Drawing Sheets

SEMICONDUCTOR OPTICAL MODULATOR

BACKGROUND OF THE INVENTION

1. Field of the Invention

The present invention relates to a semiconductor optical modulator of Mach-Zehnder type or the like.

2. Description of the Related Art

A technology relating to a p-i-n type semiconductor optical modulator is disclosed in Naoto Yoshimoto, Yasuo Shibata, Satoshi Oku, Susumu Kondo, and Yoshio Noguchi, "Design and Demonstration of Polarization-Insensitive Mach-Zehnder Switch Using a Lattice-Matched InGaAlAs/InAlAs MQW and Deep-Etched High-Mesa Waveguide Structure", JOURNAL OF LIGHTWAVE TECHNOLOGY, VOL. 17, No. 9, pp. 1662, SEPTEMBER 1999. The p-i-n type semiconductor optical modulator disclosed in the above-described non patent literature has an optical waveguide in which a phase of light is modulated. The optical waveguide includes a p-type cladding layer, an i-type core layer, and an n-type cladding layer. The i-type core layer corresponds to a core of the optical waveguide and is disposed between the p-type cladding layer and the n-type cladding layer. The i-type core layer has an i-type multiple quantum well (MQW) structure.

Light propagating in the optical waveguide is absorbed due to free-carrier absorption when free carriers (electrons in the conduction band or holes in the valence band) are present in the optical waveguide. In addition, as the free carriers increase or decrease in the optical waveguide, the refractive index in the optical waveguide is also changes in accordance with the Kramers-Kronig relation. Such a phenomenon is known as a plasma effect with respect to the free carrier.

SUMMARY OF THE INVENTION

In order to use the plasma effect to phase modulation in the optical waveguide, it is necessary to dispose a p-n junction in the optical waveguide. Specifically, it is necessary to dispose the p-n junction in the core layer (or in the vicinity of the core layer) of the optical waveguide. When the p-n junction is reverse-biased, a depletion region is formed in the vicinity of the p-n junction. Consequently, free carriers are reduced in the depletion region in the vicinity of the p-n junction, so that the refractive index also changes on the basis of the plasma effect. In this manner, phase modulation for light propagating in the optical waveguide becomes possible. The amount of change in the refractive index in this case is on the order of $10^{-3}$. This amount of change in the refractive index is sufficient to modulate light in the Mach-Zehnder Optical Modulator and the like.

On the other hand, in an optical waveguide having a core layer provided with a p-n junction (hereafter referred to as a p-n type optical waveguide), the region occupied by an i-layer in the core layer is relatively small. Therefore, the light propagates through any one of a p-layer and an n-layer in the optical waveguide. In the case of the p-n type optical waveguide, an optical loss increases because of optical absorption by free carriers (electrons or holes) as compared with a conventional optical waveguide in which a core layer is an i-layer (hereafter referred to as a p-i-n type optical waveguide). In addition, a depletion layer formed in the p-n type optical waveguide is thinner than a depletion layer formed in the p-i-n type optical waveguide. In accordance with this difference in thickness of the depletion layer, the capacitance of the p-n type optical waveguide is higher than the capacitance of the p-i-n type optical waveguide. Consequently, the operation speed (high frequency performance) of the p-n type optical waveguide is lower than that of the p-i-n type optical waveguide. Therefore, it has been believed previously that the plasma effect is not suitable for application to a semiconductor optical modulator with a relatively high speed of 10 Gbit/s or more.

Meanwhile, the semiconductor optical modulator described in the above-described non patent literature has a p-i-n type optical waveguide. The core layer of this p-i-n type optical waveguide is formed from an i-type semiconductor layer with a low impurity concentration. Therefore, the p-i-n type optical waveguide described in the above-described non patent literature is superior to the p-n type because of a low optical loss and a small capacitance, as described above. However, in the case of the p-i-n type optical waveguide, the amount of change in the refractive index (amount of phase modulation) due to an applied voltage on the basis of the plasma effect is small as compared with that in the p-n type. Consequently, the semiconductor optical modulator including the p-i-n type optical waveguide has a problem in that a switching voltage (modulation voltage) is relatively large.

A semiconductor optical modulator according to a first aspect of the present invention includes a substrate; and a mesa portion having a first cladding layer disposed on the substrate, a core layer disposed on the first cladding layer, and a second cladding layer disposed on the core layer, the first cladding layer having a first conductivity type, the second cladding layer having a second conductivity type reverse to the first conductivity type. The core layer includes a first multi quantum well structure made from a first conductivity type semiconductor layer and a second multi quantum well structure made from an i-type semiconductor layer in which no impurity is intentionally doped. The second multi quantum well structure is disposed on the first cladding layer. The first multi quantum well structure is disposed on the second multi quantum well structure. The second cladding layer is disposed on the first multi quantum well structure.

According to the semiconductor optical modulator of the present invention, the core layer includes the first multi quantum well structure made from the first conductivity type semiconductor layer and the second multi quantum well structure made from the i-type semiconductor layer in which no impurity is intentionally doped. The first multi quantum well structure is disposed close to the second conductivity type second cladding layer in the core layer. Therefore, when the p-n junction of the core layer in the semiconductor optical modulator is reverse biased, a depletion region is formed in the second conductivity type second cladding layer and the first conductivity type first multi quantum well structure disposed close to this second cladding layer. Consequently, the plasma effect is obtained and the refractive index of the core layer changes. Therefore, in the semiconductor optical modulator according to the present invention, phase modulation is possible even when the core layer includes the second multi quantum well structure made from the i-type semiconductor layer and the first multi quantum well structure made from the first conductivity type semiconductor layer. The core layer includes not only the first multi quantum well structure made from the first conductivity type semiconductor layer, but also the second multi quantum well structure made from the i-type semiconductor layer. Consequently, thickness of the first multi quantum well structure made from the first conductivity type semiconductor layer can be reduced. Therefore, an optical loss and a capacitance of the semiconductor optical modulator can be reduced as compared with those in the p-n type semiconductor optical modulator in which the whole core layer is made from an n-type or a p-type semiconductor layer. In addition, the amount of change in the refractive index (amount of phase modulation) increases as compared with that in the p-i-n type semiconductor optical modulator in which the whole core layer is made from the i-type semiconductor layer.

In the semiconductor optical modulator according to the present invention, the first multi quantum well structure has an impurity concentration increasing as the distance from the second cladding layer decreases. Therefore, a depletion region is generated, where a starting point is in between the first multi quantum well structure made from the first conductivity type semiconductor layer and the second conductivity type second cladding layer. At this time, a gradient is provided to the impurity concentration in such a way that the impurity concentration increases toward this starting point. In this case, the first multi quantum well structure can be depleted almost completely.

In the semiconductor optical modulator according to the present invention, the mesa portion may further have a first optical confinement layer and a second optical confinement layer. The first optical confinement layer is preferably disposed between the first cladding layer and the core layer. The first optical confinement layer has a refractive index higher than the refractive index of the first cladding layer. The second optical confinement layer is preferably disposed between the second cladding layer and the core layer. The second optical confinement layer has a refractive index higher than the refractive index of the second cladding layer. Optical confinement into the core layer is increased by sandwiching the core layer between the first optical confinement layer and the second optical confinement layer. It is preferable that the optical confinement into the core layer be stronger because the amount of phase modulation increases relative to the same amount of change in the refractive index.

In the semiconductor optical modulator according to the present invention, the first multi quantum well structure has an impurity concentration, the average value of the impurity concentration being within the range of $5\times10^{16}$ cm$^{-3}$ or more and $5\times10^{17}$ cm$^{-3}$ or less. As the impurity concentration in the first multi quantum well structure becomes low in the core layer, the optical loss is reduced. On the other hand, as the impurity concentration in the first multi quantum well structure becomes high, the amount of change in the refractive index increases. If the impurity concentration increases to a certain extent or more, the proportion of impurities which are activated electrically is reduced and the carrier density in the semiconductor layer tends to become saturated. Therefore, there is a tendency of saturation in the relationship between the impurity concentration and the amount of change in the refractive index. Consequently, it is favorable that the impurity concentration of the first multi quantum well (MQW) structure be within the range of $5\times10^{16}$ cm$^{-3}$ or more and $5\times10^{17}$ cm$^{-3}$ or less.

In the semiconductor optical modulator according to the present invention, the first multi quantum well structure has a thickness within the range of one-third or more and two-thirds or less of the thickness of the core layer. Therefore, the region occupied by the first multi quantum well structure made from the first conductivity type semiconductor layer may be substantially corresponds to the depletion region in the core layer. When the first multi quantum well structure is larger than the depletion region, the optical loss and the capacitance increase because of a region not depleted. On the other hand, the amount of change in the refractive index hardly changes.

In the semiconductor optical modulator according to the present invention, the second multi quantum well structure has a thickness within the range of one-third or more and two-thirds or less of the thickness of the core layer. Therefore, as the thickness of the second multi quantum well structure made from the i-type semiconductor layer becomes large, the optical loss and the capacitance can be reduced. In this case, an increase in a switching voltage is induced.

In the semiconductor optical modulator according to the present invention, the core layer may further include a third multi quantum well structure made from an i-type semiconductor layer in which no impurity is intentionally doped. The third multi quantum well structure is disposed between the first multi quantum well structure and the second cladding layer. The third multi quantum well structure preferably has a thickness smaller than the thickness of the second multi quantum well structure. Therefore, the third multi quantum well structure made from the i-type semiconductor layer having a relatively small film thickness is disposed between the first multi quantum well structure and the second cladding layer. In this case as well, the thickness of the third multi quantum well structure made from the i-type semiconductor layer is relatively small, so that a depletion region in which a change in the refractive index occurs sufficiently can be formed.

In the semiconductor optical modulator according to the present invention, the total thickness of the second multi quantum well structure and the third multi quantum well structure is within the range of one-third or more and two-thirds or less of the thickness of the core layer. Therefore, as the total thickness of the second multi quantum well structure made from the i-type semiconductor layer and the third multi quantum well structure made from the i-type semiconductor layer becomes larger, the optical loss and the capacitance can be reduced. In this case, an increase in a switching voltage is induced. The semiconductor optical modulator according to the present invention may further include an electrode which is disposed on the mesa portion.

A semiconductor optical modulator according to another aspect of the present invention includes a substrate; and a mesa portion having a first cladding layer disposed on the substrate, a core layer disposed on the first cladding layer, and a second cladding layer disposed on the core layer, the first cladding layer having a first conductivity type, the second cladding layer having a second conductivity type reverse to the first conductivity type. The core layer includes a first multi quantum well structure made from a second conductivity type semiconductor layer and a second multi quantum well structure made from an i-type semiconductor layer in which no impurity is intentionally doped. The first multi quantum well structure is disposed on the first cladding layer. The second multi quantum well structure is disposed on the first multi quantum well structure. The second cladding layer is disposed on the second multi quantum well structure.

According to the semiconductor optical modulator of the present invention, the core layer includes the first multi quantum well structure made from the second conductivity type semiconductor layer and the second multi quantum well structure made from the i-type semiconductor layer in which no impurity is intentionally doped. The first multi quantum well structure is disposed close to the first conductivity type first cladding layer in the core layer. Therefore, when the p-n junction of the core layer in the semiconductor optical modulator is reverse biased, a depletion region is formed in the first conductivity type first cladding layer and the first multi quantum well structure which is made from the second conductivity type semiconductor layer. Consequently, the plasma effect is obtained and the refractive index of the core layer changes. Therefore, in the semiconductor optical modulator according to the present invention, phase modulation is possible even when the core layer includes the first multi quantum well structure made from the second conductivity type semiconductor layer and the second multi quantum well structure made from the i-type semiconductor layer. The core layer includes not only the first multi quantum well structure made from the second conductivity type semiconductor layer, but also the second multi quantum well structure made from the i-type semiconductor layer. Consequently, the thickness of the first multi quantum well structure made from the second conductivity type semiconductor layer can be reduced. Therefore, an optical loss and a capacitance of the semiconductor optical modulator are reduced as compared with those in p-n type semiconductor optical modulator in which the whole core layer is made from an n-type or a p-type semiconductor layer. In addition, the amount of change in the refractive index (amount of phase modulation) increases as compared with that in the p-i-n type semiconductor optical modulator in which the whole core layer is made from the i-type semiconductor layer.

In the semiconductor optical modulator according to the present invention, the first multi quantum well structure has an impurity concentration increasing as the distance from the first cladding layer decreases. Therefore, a depletion region is generated, where a starting point is in between the first multi quantum well structure made from the second conductivity type semiconductor layer and the first conductivity type first cladding layer. At this time, a gradient is provided to the impurity concentration in such a way that the impurity concentration increases toward this starting point. In this case, the first multi quantum well structure can be depleted almost completely.

In the semiconductor optical modulator according to the present invention, the core layer may further include a third multi quantum well structure made from an i-type semiconductor layer in which no impurity is intentionally doped. The third multi quantum well structure is disposed between the first cladding layer and the first multi quantum well structure. The third multi quantum well structure has a thickness smaller than the thickness of the second multi quantum well structure. Therefore, the third multi quantum well structure made from the i-type semiconductor layer having a relatively small film thickness is disposed between the first cladding layer and the first multi quantum well structure. In this case as well, the thickness of the third multi quantum well structure made from the i-type semiconductor layer is relatively small, so that a depletion region in which a change in the refractive index occurs sufficiently can be formed.

BRIEF DESCRIPTION OF THE DRAWINGS

FIG. 2 schematically shows a cross-sectional structure of a semiconductor optical modulator according to an embodiment, taken along a line I-I shown in FIG. 1

DESCRIPTION OF THE PREFERRED EMBODIMENTS

The preferred embodiments according to the present invention will be described below in detail with reference to the drawings. In explanations of the drawings, the same elements are indicated by the same reference numerals and explanations thereof are not repeated, where possible.

The configuration of a semiconductor optical modulator 1 according to an embodiment will be described with reference to FIG. 1 to FIG. 6D. The semiconductor optical modulator 1 is a Mach-Zehnder semiconductor optical modulator. The semiconductor optical modulator 1 includes a stacked body K1, an optical waveguide F1a, an optical waveguide F1b, an optical coupler 3, an optical waveguide F1a, an optical waveguide F2b, an electrode pad E2a, an electrode pad E2b, a modulation electrode E1a, a modulation electrode E1b, an optical waveguide F3a, an optical waveguide F3b, an electrode pad E3a, an electrode pad E3b, an optical waveguide F4a, an optical waveguide F4b, an optical coupler 5, an optical waveguide F5a, an optical waveguide F5b, and a GND electrode 13. The stacked body K1 includes a substrate 11, a mesa portion 15, and a resin layer 17. The stacked body K1, optical waveguide F1a, the optical waveguide F1b, the optical coupler 3, the optical waveguide F2a, the optical waveguide F2b, the electrode pad E2a, the electrode pad E2b, the modulation electrode E1a, the modulation electrode E1b, the optical waveguide F3a, the optical waveguide F3b, the electrode pad E3a, the electrode pad E3b, the optical waveguide F4a, the optical waveguide F4b, the optical coupler 5, the optical waveguide F5a, and the optical waveguide F5b are disposed on a upper surface side of the substrate 11. The GND electrode 13 is disposed on a back surface of the substrate 11. Alternatively, the GND electrode 13 may be disposed in a region not provided with the stacked body K1 on the upper surface side of the substrate 11.

Figure 1:
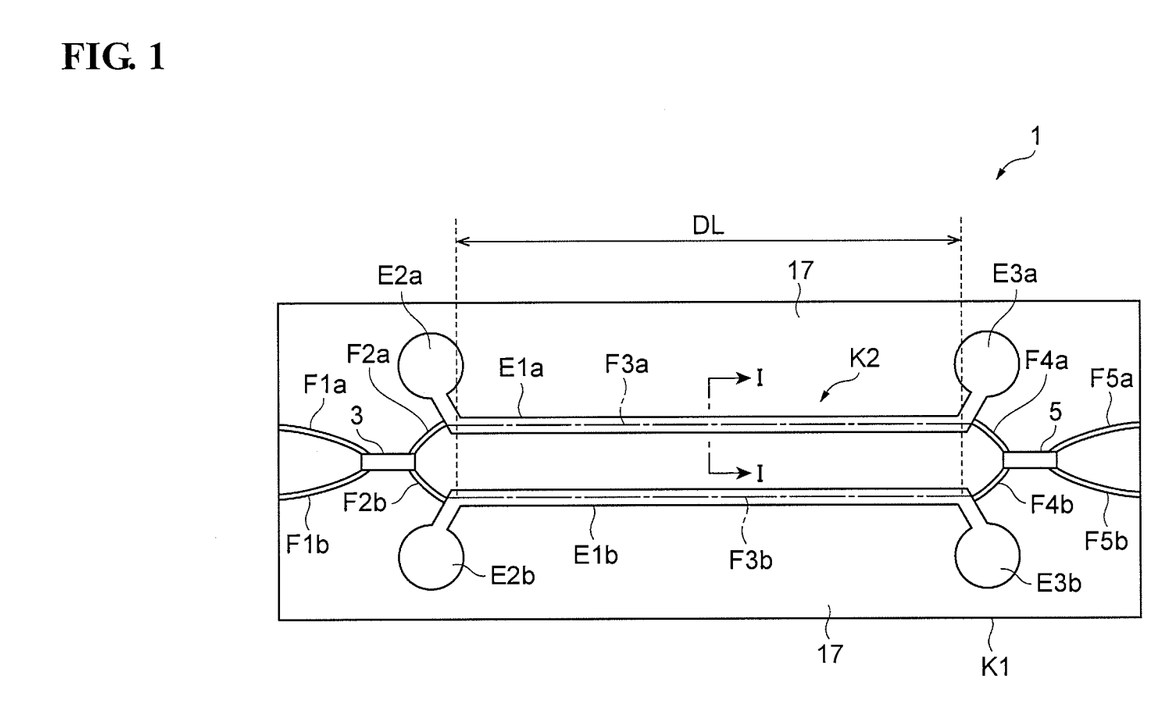
FIG. 1 is a diagram showing the configuration of a semiconductor optical modulator according to an embodiment.

The modulation electrode E1a is connected to the electrode pad E2a and the electrode pad E3a. The modulation electrode E1b is connected to the electrode pad E2b and the electrode pad E3b. A voltage for modulation is applied to each of the modulation electrode E1a and the modulation electrode E1b independently. The GND electrode 13 is connected to the ground.

The optical waveguide F1a, the optical waveguide F1b, the optical waveguide F2a, and the optical waveguide F2b are connected to the optical coupler 3. The optical waveguide F5a, the optical waveguide F5b, the optical waveguide F4a, and the optical waveguide F4b are connected to the optical coupler 5. The optical coupler 3 and the optical coupler 5 are multimode interferometer (MMI) couplers.

One end of the optical waveguide F3a is connected to the optical waveguide F2a. The other end of the optical waveguide F3a is connected to the optical waveguide F4a. One end of the optical waveguide F3b is connected to the optical waveguide F2b. The other end of the optical waveguide F3b is connected to the optical waveguide F4b. The modulation electrode E1a is extended along the optical waveguide F3a and covers the optical waveguide F3a. The optical waveguide F3a is disposed between the modulation electrode E1a and the GND electrode 13. The modulation electrode E1b is extended along the optical waveguide F3b and covers the optical waveguide F3b. The optical waveguide F3b is disposed between the modulation electrode E1b and the GND electrode 13. The length DL of the modulation electrode E1a or the modulation electrode E1b is within the range of 2.5 mm or more and 3.0 mm or less. The light propagating through the optical waveguide F3a can be modulated by applying a voltage to the modulation electrode E1a. The light propagating through the optical waveguide F3b can be modulated by applying a voltage to the modulation electrode E1b.

Figure 2:
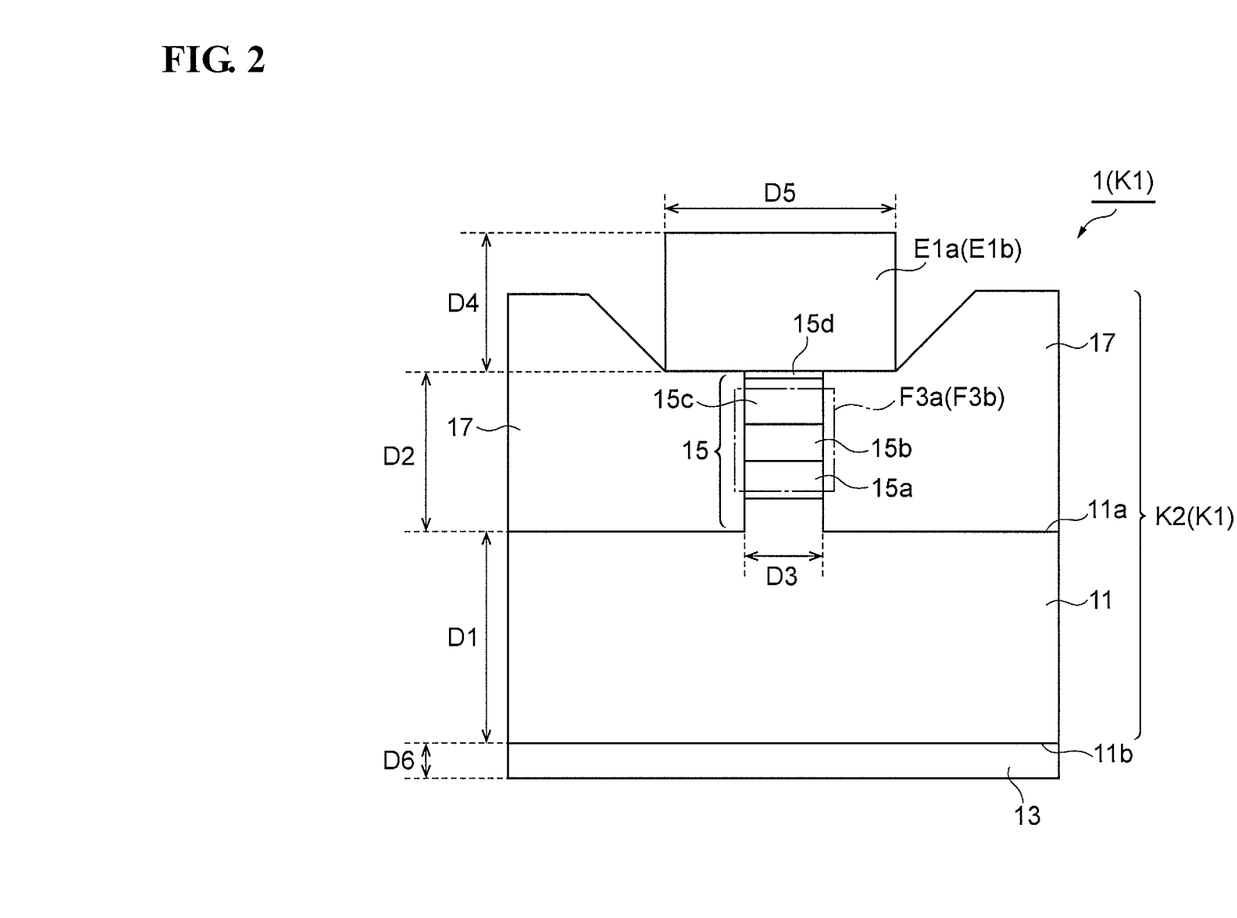
FIG. 2 is a diagram mainly illustrating the configuration of an optical waveguide according to an embodiment.

FIG. 2 schematically shows a cross-sectional structure of the semiconductor optical modulator 1, taken along a line I-I shown in FIG. 1. The structure shown in FIG. 2 is a structure of a region sandwiched between the modulation electrode E1a and the GND electrode 13 (hereafter referred to as a modulation region K2 and the semiconductor optical modulator 1 includes the modulation region K2). The structure of the other modulation region sandwiched between the modulation electrode E1b and the GND electrode 13 is the same as the structure shown in FIG. 2.

The modulation region K2 includes the GND electrode 13, the substrate 11, the mesa portion 15, the resin layer 17, and the modulation electrode E1a. The substrate 11 and the mesa portion 15 are made from semiconductors. The mesa portion 15 is disposed on the substrate 11. The mesa portion 15 is extended upward from a principal surface 11a of the substrate 11. The GND electrode 13 is disposed on a back surface 11b of the substrate 11. The modulation electrode E1a is disposed on the mesa portion 15.

The mesa portion 15 is constituted by a stacked semiconductor layer and has a cladding layer 15a, a core layer 15b, a cladding layer 15c, and a contact layer 15d. The optical waveguide F3a includes the cladding layer 15a, the core layer 15b, and the cladding layer 15c. The resin layer 17 is disposed on the principal surface 11a of the substrate 11 and on a side surface of the mesa portion 15. The modulation electrode E1a is in contact with the contact layer 15d. The GND electrode 13 is in contact with the back surface 11b of the substrate 11.

Both the substrate 11 and the cladding layer 15a are made from semiconductors of a first conductivity type which is any one of the p-type and n-type. Both the contact layer 15d and the cladding layer 15c are formed from semiconductors of a second conductivity type reverse to the first conductivity type. The core layer 15b has a quantum well (QW) structure including a well layer of the conductivity type of any one of the p-type and the n-type and at least one i-type well layer (for example, two i-type well layers may be included). In particular, the core layer 15b has a multi quantum well (MQW) structure including a plurality of well layers and a plurality of barrier layers. In the core layer 15b, the well layers and the barrier layers are disposed alternately. Here, the i-type well layer (semiconductor layer) refers to a well layer (semiconductor layer) in which a p-type or n-type impurity is not intentionally doped, and usually, the impurity concentration thereof is $1\times10^{16}$ cm$^{-3}$ or less.

The thickness D1 of the substrate 11 is within the range of 140 μm or more and 160 μm or less. The thickness D2 of the mesa portion 15 is within the range of 3 μm or more and 5 μm or less. The width D3 of the mesa portion 15 is within the range of 1.0 μm or more and 2.0 μm or less. The thickness D4 of the modulation electrode E1a is within the range of 2.5 μm or more and 3.5 μm or less. The width D5 of the modulation electrode E1a is within the range of 4.5 μm or more and 5.5 μm or less. The thickness D6 of the GND electrode 13 is within the range of 0.8 μm or more and 1.2 μm or less.

Figure 3:
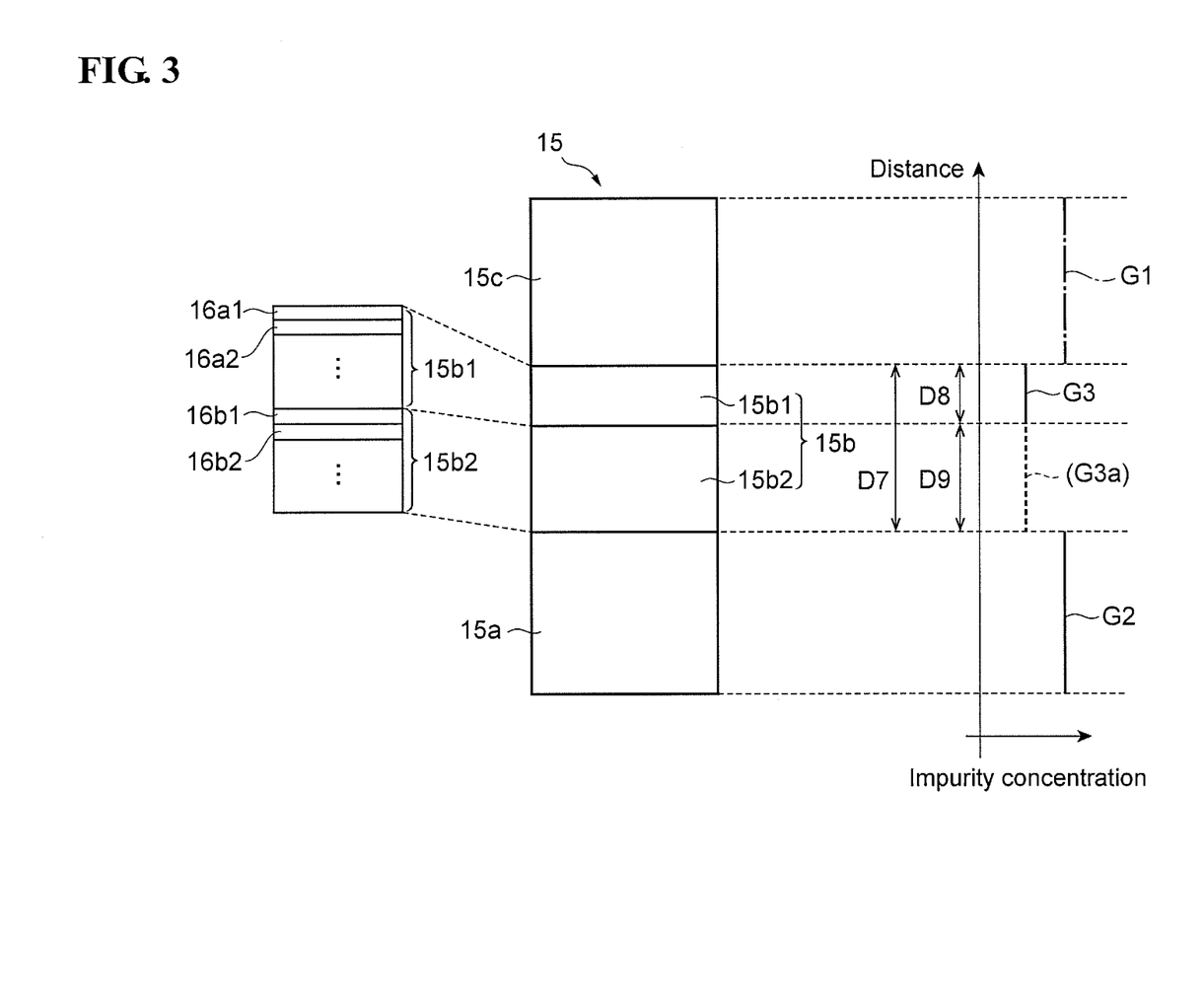
FIG. 3 is a diagram showing one relationship between an optical waveguide and an impurity concentration according to an embodiment.

FIG. 3 shows one specific example of the mesa portion 15. The configuration of the mesa portion 15 shown in FIG. 3 is the configuration of a portion corresponding to the optical waveguide F3a. FIG. 3 also shows the impurity concentration corresponding to the above-described configuration shown in FIG. 3. The core layer 15b has a multi quantum well (MQW) structure. The core layer 15b is formed from a multi quantum well (MQW) structure 15b1 and a multi quantum well (MQW) structure 15b2. The multi quantum well (MQW) structure 15b2 is disposed on the cladding layer 15a. The multi quantum well (MQW) structure 15b1 is disposed on the multi quantum well (MQW) structure 15b2. The cladding layer 15c is disposed on the multi quantum well (MQW) structure 15b1.

The cladding layer 15a is in contact with the multi quantum well (MQW) structure 15b2. The multi quantum well (MQW) structure 15b2 is in contact with the multi quantum well (MQW) structure 15b1. The multi quantum well (MQW) structure 15b1 is in contact with the cladding layer 15c. The thickness D8 of the multi quantum well (MQW) structure 15b1 is within the range of one-third or more and two-thirds or less of the thickness D7 of the core layer 15b. The thickness D9 of the multi quantum well (MQW) structure 15b2 is within the range of one-third or more and two-thirds or less of the thickness D7 of the core layer 15b. The thickness D7 of the core layer 15b is the total thickness of the thickness D8 and the thickness D9.

The multi quantum well (MQW) structure 15b1 is formed from a semiconductor layer doped with a first conductivity type impurity. The multi quantum well (MQW) structure 15b2 is formed from an i-type semiconductor layer in which no impurity is intentionally doped. The multi quantum well (MQW) structure 15b1 has a plurality of barrier layers 16a1 doped with a first conductivity type impurity and a plurality of well layers 16a2 doped with a first conductivity type impurity. The multi quantum well (MQW) structure 15b2 has a plurality of i-type barrier layers 16b1 and a plurality of i-type well layers 16b2.

The impurity concentration in the mesa portion 15 is indicated by a graph G1, a graph G2, and a graph G3 shown in FIG. 3. The graph G1 indicates a second conductivity type impurity concentration in the cladding layer 15c. The graph G3 indicates a first conductivity type impurity concentration in the multi quantum well (MQW) structure 15b1. The graph G2 indicates a first conductivity type impurity concentration in the cladding layer 15a. The average value of the concentration of the first conductivity type impurity added to the multi quantum well (MQW) structure 15b1 is within the range of $5\times10^{16}$ cm$^{-3}$ or more and $5\times10^{17}$ cm$^{-3}$ or less.

The multi quantum well (MQW) structure 15b2 may be formed from a semiconductor layer doped with a second conductivity type impurity and the multi quantum well (MQW) structure 15b1 may be formed from an i-type semiconductor layer in which no impurity is intentionally doped. In this case, second conductivity type impurities are doped into both the barrier layers 16b1 and the well layers 16b2. On the other hand, both the barrier layers 16a1 and the well layers 16a2 are formed from i-type semiconductor layers. When the multi quantum well (MQW) structure 15b2 is formed from a semiconductor layer doped with a second conductivity type impurity and the multi quantum well (MQW) structure 15b1 is formed from an i-type semiconductor layer, the impurity concentration in the mesa portion 15 is indicated by the graph G1, the graph G2, and the graph G3a shown in FIG. 3. The graph G3a indicates a second conductivity type impurity concentration in the multi quantum well (MQW) structure 15$b$2. The average value of the concentration of the second conductivity type impurity added to the multi quantum well (MQW) structure 15$b$2 is within the range of $5 \times 10^{16}$ cm$^{-3}$ or more and $5 \times 10^{17}$ cm$^{-3}$ or less. In this case, the multi quantum well (MQW) structure 15$b$1 is formed from an i-type semiconductor layer and, therefore, an impurity is not doped intentionally.

The substrate 11, the cladding layer 15$a$, and the cladding layer 15$c$ may be made of, for example, InP, GaAs, or Si. When the substrate 11, the cladding layer 15$a$, and the cladding layer 15$c$ are made of InP, the well layer and the barrier layer of the core layer 15$b$ may be constituted by combinations of AlGaInAs/AlInAs, AlGaInAs/AlGaInAs, AlGaInAs/InP, GaInAsP/GaInAsP, and GaInAsP/InP, for example.

When the substrate 11, the cladding layer 15$a$, and the cladding layer 15$c$ are made of GaAs, the well layer and the barrier layer of the core layer 15$b$ may be constituted by combinations of GaAs/AlGaAs and InGaAs/GaAs, for example. When the substrate 11, the cladding layer 15$a$, and the cladding layer 15$c$ are made of Si, the well layer and the barrier layer of the core layer 15$b$ may be constituted by combinations of Ge/GeSi and SiGe/Si. The resin layer 17 may be made of Bisbenzocyclobutene (BCB) resin, a polyimide resin, a semiconductor, or the like. The BCB resin and the polyimide resin have a low-dielectric constant. The modulation electrode E1$a$ and the modulation electrode E1$b$ may be made of, for example, Ti/Pt/Au. The GND electrode 13 may be made of, for example, Au/Ge/Ni.

The first conductivity type may be the p-type, and the second conductivity type may be the n-type. Alternatively, the first conductivity type may be the n-type and the second conductivity type may be the p-type. When a semiconductor layer is made of a III-V group compound semiconductor such as InP and GaAs, S, Sn, and Si may be used for the n-type impurity, and Zn, and C may be used for the p-type impurity, for example.

Next, the operations and the advantages of the semiconductor optical modulator 1 will be described. When p-n junction is reverse biased through the modulation electrode E1$a$ and the GND electrode 13 of the semiconductor optical modulator 1, a depletion region is formed in the cladding layer and the well layer, the well layer having the conductivity type reverse to the conductivity type of this cladding layer and being disposed close to this cladding layer. Consequently, the refractive index of the core layer 15$b$ changes due to the plasma effect. Therefore, phase modulation becomes possible even when the core layer 15$b$ includes a well layer doped with the first or second conductivity type impurity and an i-type well layer in the semiconductor optical modulator 1.

The core layer 15$b$ includes the well layer doped with the first or second conductivity type impurity and the i-type well layer. Consequently, thickness of the well layer doped with the first or second conductivity type impurity in the core layer 15$b$ can be reduced. Therefore, both the amount of optical loss and the capacitance (capacitance between the modulation electrode E1$a$ and the GND electrode 13, and the same goes for the following), can be reduced. As described above, in the semiconductor optical modulator 1, both the amount of optical loss and the capacitance are reduced as compared with those in the semiconductor optical modulator in which the whole core layer 15$b$ is doped with impurity of the first or second conductivity type. In addition, the amount of change in the refractive index (amount of phase modulation) increases as compared with that in the semiconductor optical modulator in which the whole core layer is made from an i-type semiconductor layer.

As the impurity concentration in the well layer becomes low in the core layer 15$b$, the optical loss is suppressed. On the other hand, as the impurity concentration in the well layer becomes high in the core layer 15$b$, the amount of change in the refractive index increases. If the impurity is added and the concentration increases to a certain extent or more, the proportion of impurities which are activated electrically is reduced and the carrier density in the semiconductor layer tends to become saturated. Therefore, there is a tendency of saturation in the relationship between the impurity concentration and the amount of change in the refractive index. Consequently, when the multi quantum well (MQW) structure 15$b$1 is of the first conductivity type, the impurity concentration of the multi quantum well (MQW) structure 15$b$1 is preferably within the range of $5 \times 10^{16}$ cm$^{-3}$ or more and $5 \times 10^{17}$ cm$^{-3}$ or less. In addition, when the multi quantum well (MQW) structure 15$b$2 is of the second conductivity type, the impurity concentration of the multi quantum well (MQW) structure 15$b$2 is preferably within the range of $5 \times 10^{16}$ cm$^{-3}$ or more and $5 \times 10^{17}$ cm$^{-3}$ or less.

Preferably, the region occupied by the well layer doped with the first or second conductivity type impurity (n-type or p-type impurity) in the core layer 15$b$ substantially corresponds to the depletion region in the core layer 15$b$. When the thickness of the well layer doped with an impurity is larger than that of the depletion region, the optical loss and the capacitance of the semiconductor optical modulator increase. On the other hand, the amount of change in the refractive index hardly changes.

In the core layer 15$b$, as the thickness of the i-type well layer in which no impurity is intentionally doped becomes large, the optical loss and the capacitance of the semiconductor optical modulator are reduced. However, in this case, an increase in a switching voltage (modulation voltage) is induced.

It will be shown that, in the semiconductor optical modulator 1 according to the embodiment, both the amount of optical loss and the capacitance are reduced as compared with those in the semiconductor optical modulator in which the whole core layer is doped with the n-type or p-type impurity with reference to Examples 1 and 2 described below. Example 1 corresponds to the semiconductor optical modulator 1 according to the embodiment. Example 2 corresponds to the semiconductor optical modulator in which the whole core layer is doped with the n-type or p-type impurity. For example 2, configurations other than this configuration are the same as those in Example 1. In Example 1, the substrate 11, the cladding layer 15$a$, and the cladding layer 15$c$ are made of InP. The substrate 11 and the cladding layer 15$a$ are doped with an n-type impurity. The cladding layer 15$c$ is doped with a p-type impurity. The multi quantum well (MQW) structure 15$b$1 is formed from a semiconductor layer doped with an n-type impurity. The multi quantum well (MQW) structure 15$b$2 is formed from an i-type semiconductor layer in which no impurity is intentionally doped. The barrier layer 16$a$1 is made of AlInAs. The well layer 16$a$2 is made of AlGaInAs. The total number of each of the barrier layer 16$a$1 and the well layer 16$a$2 included in the multi quantum well (MQW) structure 15$b$1 is 13. The total number of well layers included in the core layer 15$b$ is 25, and the total number of barrier layers included in the core layer 15$b$ is 26. The impurity concentration in each of the cladding layer 15$a$ and the cladding layer 15$c$ is about $2 \times 10^{17}$ cm$^{-3}$. The impurity concentration in the multi quantum well (MQW) structure 15$b$1 is about $1 \times 10^{17}$ cm$^{-3}$. The n-type impurity for the multi quantum well (MQW) structure 15$b$1 is Si. The resin layer 17 is made of BCB resin having a low-dielectric constant. The length DL of the modulation electrode E1b is about 2.8 mm. The thickness D1 of the substrate 11 is about 150 μm. The thickness D2 of the mesa portion 15 is about 4 μm. The width D3 of the mesa portion 15 is about 1.5 μm. The thickness D4 of the modulation electrode E1a is about 3 μm. The width D5 of the modulation electrode E1a is about 5 μm. The thickness D6 of the GND electrode 13 is about 1 μm. The thickness of the multi quantum well (MQW) structure 15b1 is nearly equal to the thickness of the multi quantum well (MQW) structure 15b2. The voltage applied to the modulation electrode E1a and the like is changed, and the GND electrode 13 is connected to the ground. The multi quantum well (MQW) structure 15b1 is in contact with the cladding layer 15c.

Initially, the optical loss and the capacitance in Example 1 and example 2 are determined by numerical calculation. The optical loss in Example 2 is about 0.8 dB/mm. Meanwhile, the optical loss in Example 1 is about 0.4 dB/mm. The optical loss in Example 1, therefore, is reduced to about half the optical loss in Example 2. The capacitance in Example 2 is 1.3 pF/mm. Meanwhile, the capacitance in Example 1 is 0.49 pF/mm. The capacitance in Example 1, therefore, is reduced to about one-third of the capacitance in Example 2.

Figure 4A:
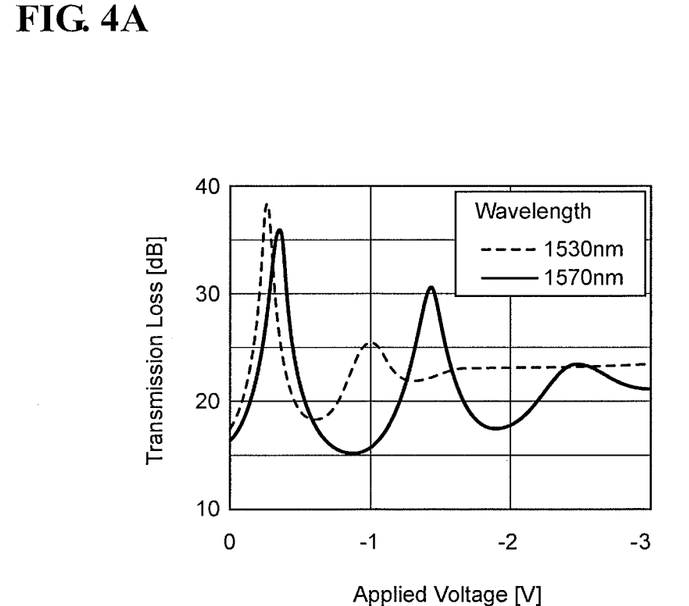
FIGS. 4A and 4B are diagrams illustrating effects of semiconductor optical modulators according to embodiments.
Figure 4B:
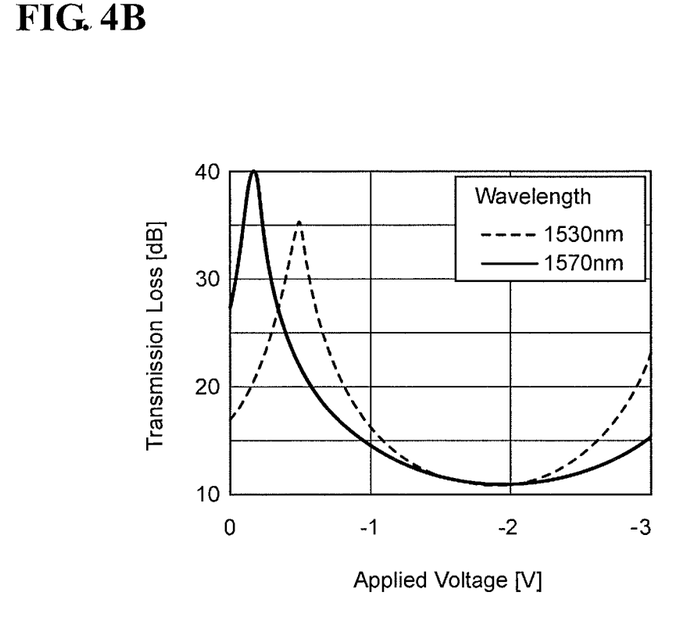

Then, it will be experimentally shown that the amount of phase modulation in the semiconductor optical modulator 1 according to the embodiment is improved as compared with that in the semiconductor optical modulator in which the whole core layer is not doped (the case where the whole core is made from an i-type semiconductor layer). In Example 3, the whole core layer is configured to be doped with no impurity (the case where the whole core is made from an i-type semiconductor layer), and configurations other than this configuration are the same as those in Example 1. In Example 1, the thickness of the multi quantum well (MQW) structure 15b1 is nearly equal to the thickness of the multi quantum well (MQW) structure 15b2. Therefore, carriers are allowed to be depleted completely at an assumed lower limit (−4 V) of the applied voltage. As for Examples 1 and 3, FIGS. 4A and 4B show the experimental results on light transmission loss characteristic versus applied voltage. FIG. 4A shows the experimental results on light transmission loss characteristic versus applied voltage in Example 1. FIG. 4B shows the experimental results on light transmission loss characteristic versus applied voltage in Example 3. In FIGS. 4A and 4B, the horizontal axis indicates the applied voltage (V). In the horizontal axis, negative values indicate that the applied voltage is a voltage in the direction reverse to the p-n junction. In FIGS. 4A and 4B, the vertical axis indicates the value of light transmission loss (dB). In both FIGS. 4A and 4B, the results of actual measurements with respect to two types of wavelength (1,570 nm and 1,530 nm) of light are shown. According to the results shown in FIGS. 4A and 4B, the switching voltage in Example 3 is about 1.3 V. Meanwhile, the switching voltage in Example 1 is about 0.6 V and, therefore, is equal to or less than half the switching voltage in Example 3. Consequently, it is clear that the amount of phase modulation in Example 1 is more than or equal to twice as much as in Example 3, when the applied voltage is constant.

Figure 5A:
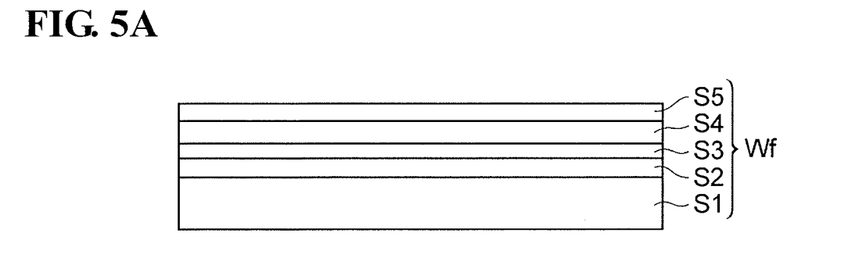
FIGS. 5A to 5E are diagrams illustrating main steps of a method for manufacturing an semiconductor optical modulator according to an embodiment.

Next, a method for manufacturing the semiconductor optical modulator 1 will be described with reference to FIGS. 5A to 5E and FIGS. 6A to 6D. In FIGS. 5A to 5E and FIGS. 6A to 6D, in particular, the manner of production of a place corresponding to the modulation region K2 of the semiconductor optical modulator 1 is shown. As shown in FIG. 5A, an epitaxial wafer Wf is prepared. In the epitaxial wafer Wf, a substrate S1, a cladding layer S2, a core layer S3, a cladding layer S4, and a contact layer S5 are disposed sequentially by a metal-organic chemical vapor deposition (MOCVD) method. The substrate S1 (and a substrate S8 descried later), the cladding layer S2, the core layer S3, the cladding layer S4, and the contact layer S5 are correspond to the substrate 11, the cladding layer 15a, the core layer 15b, the cladding layer 15c, and the contact layer 15d, respectively, shown in FIG. 2.

Figure 5B:
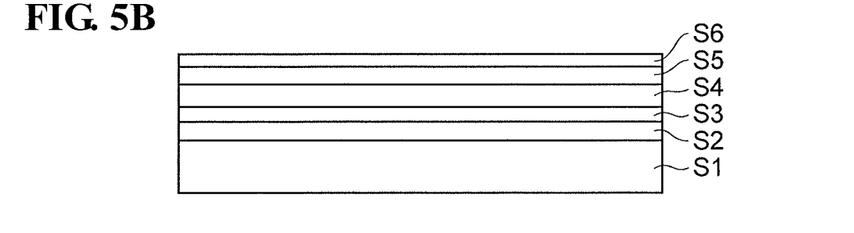

As shown in FIG. 5B, an insulating layer S6 is disposed on the contact layer S5. The insulating layer S6 is formed on the contact layer S5 by using a chemical vapor deposition (CVD) method. The insulating layer S6 is made of a dielectric film, e.g., $SiO_2$, SiON, or SiN.

Figure 5C:
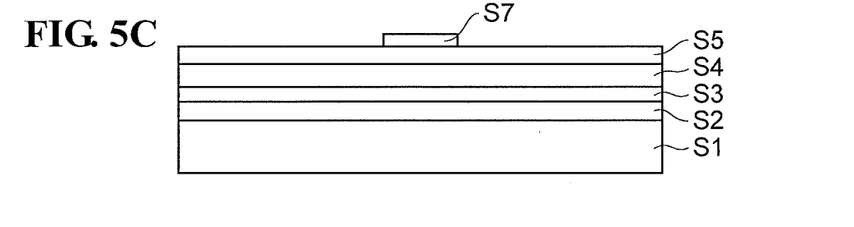

As shown in FIG. 5C, an insulating layer S7 is formed from the insulating layer S6. The insulating layer S7 is formed by photolithography using an apparatus, e.g., an i-line stepper, and a reaction ion etching (RIE) method using a gas, e.g., $CHF_3$ or $C_2F_6$.

Figure 5D:
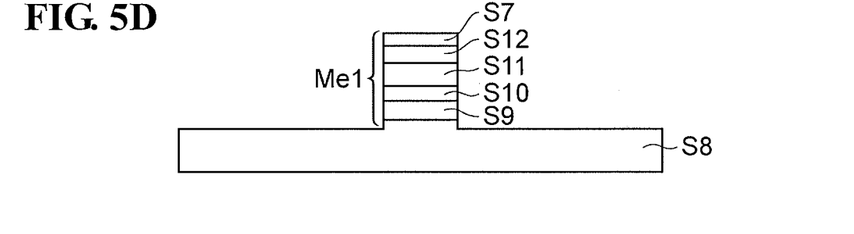

As shown in FIG. 5D, the cladding layer S2, the core layer S3, the cladding layer S4, the contact layer S5, and part of the substrate S1 are etched by RIE using a gas, e.g., $CH_4/H_2$ or $BCl_3/N_2$, while the insulating layer S7 is used as a mask. In this manner, the substrate S8 and a mesa portion Me1 extending upward from the substrate S8 are formed. The mesa portion Me1 has a cladding layer S9, a core layer S10, a cladding layer S11, a contact layer S12, and the insulating layer S7. The substrate S8, the cladding layer S9, the core layer S10, the cladding layer S11, and the contact layer S12 are portions remaining after the substrate S1, the cladding layer S2, the core layer S3, the cladding layer S4, and the contact layer S5, respectively, are etched.

Figure 5E:
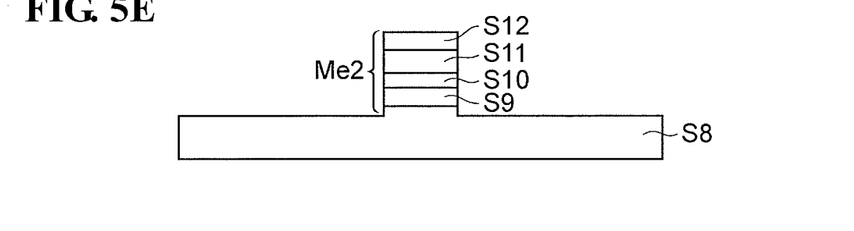

As shown in FIG. 5E, the insulating layer S7 is removed, so as to form a mesa portion Me2. The mesa portion Me2 corresponds to the mesa portion 15 shown in FIG. 2. The mesa portion Me2 is a portion remaining after the insulating layer S7 is removed from the mesa portion Me1. Removal of the insulating layer S7 is performed by wet etching using an etchant, e.g., $NH_4F:HF:H_2O$, $HF:H_2O$, or $H_3PO_4:HNO_3$.

Figure 6A:
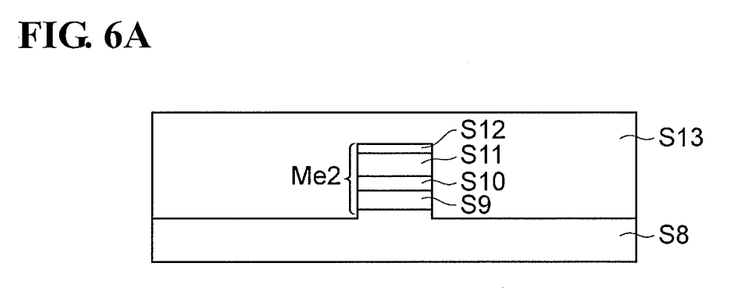
FIGS. 6A to 6D are diagrams illustrating main steps of a method for manufacturing an semiconductor optical modulator according to an embodiment.

As shown in FIG. 6A, a resin layer S13 is formed on the substrate S8 and the mesa portion Me2 in such a way as to cover the surface of the substrate S8 and the mesa portion Me2. When the resin layer is made of for example, a thermosetting resin, a process to thermally cure the resin at a temperature of 300 degrees centigrade may be included, as necessary.

Figure 6B:
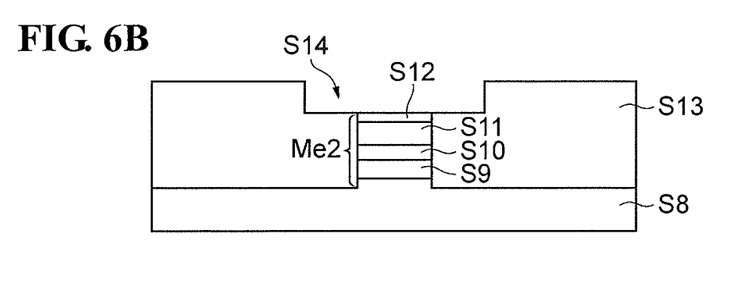

As shown in FIG. 6B, part of the resin layer S13 (region located on the mesa portion Me2) is removed by photolithography and RIE using a gas, e.g., $CF_4/O_2$ or $SF_6/O_2$, so as to form a groove portion S14. The groove portion S14 is a portion removed by etching and is located on the mesa portion Me2. The bottom of the groove portion S14 includes the surface of the contact layer S12. The surface of the contact layer S12 is exposed at the inside of the groove portion S14.

Figure 6C:
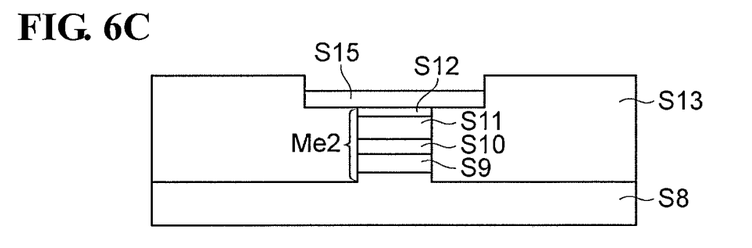

As shown in FIG. 6C, an ohmic electrode S15 is formed. The ohmic electrode S15 covers the bottom of the groove portion S14 including the surface of the contact layer S12. The ohmic electrode S15 is in contact with the contact layer S12. The ohmic electrode S15 is formed by photolithography and metal evaporation. The ohmic electrode S15 is made of, for example, Ti/Pt/Au.

Figure 6D:
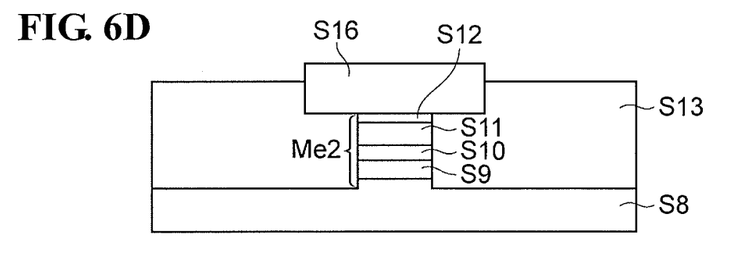

As shown in FIG. 6D, a Au layer is formed on the ohmic electrode S15 by, for example, a plating process, so as to form a modulation electrode S16 (corresponding to the modulation electrode E1a and the modulation electrode E1b). In addition, an electrode corresponding to the GND electrode 13 shown in FIG. 2 is formed on the back surface of the substrate S8 by metal evaporation.

Then, a plurality of semiconductor optical modulator 1 shown in FIG. 1 are separated from a substrate product obtained by processing the epitaxial wafer Wf as shown in FIG. 5A to the treatments shown in FIGS. 5B to 5E and FIGS. 6A to 6D. In this manner, the semiconductor optical modulator 1 is produced.

Modified Example 1

Figure 7:
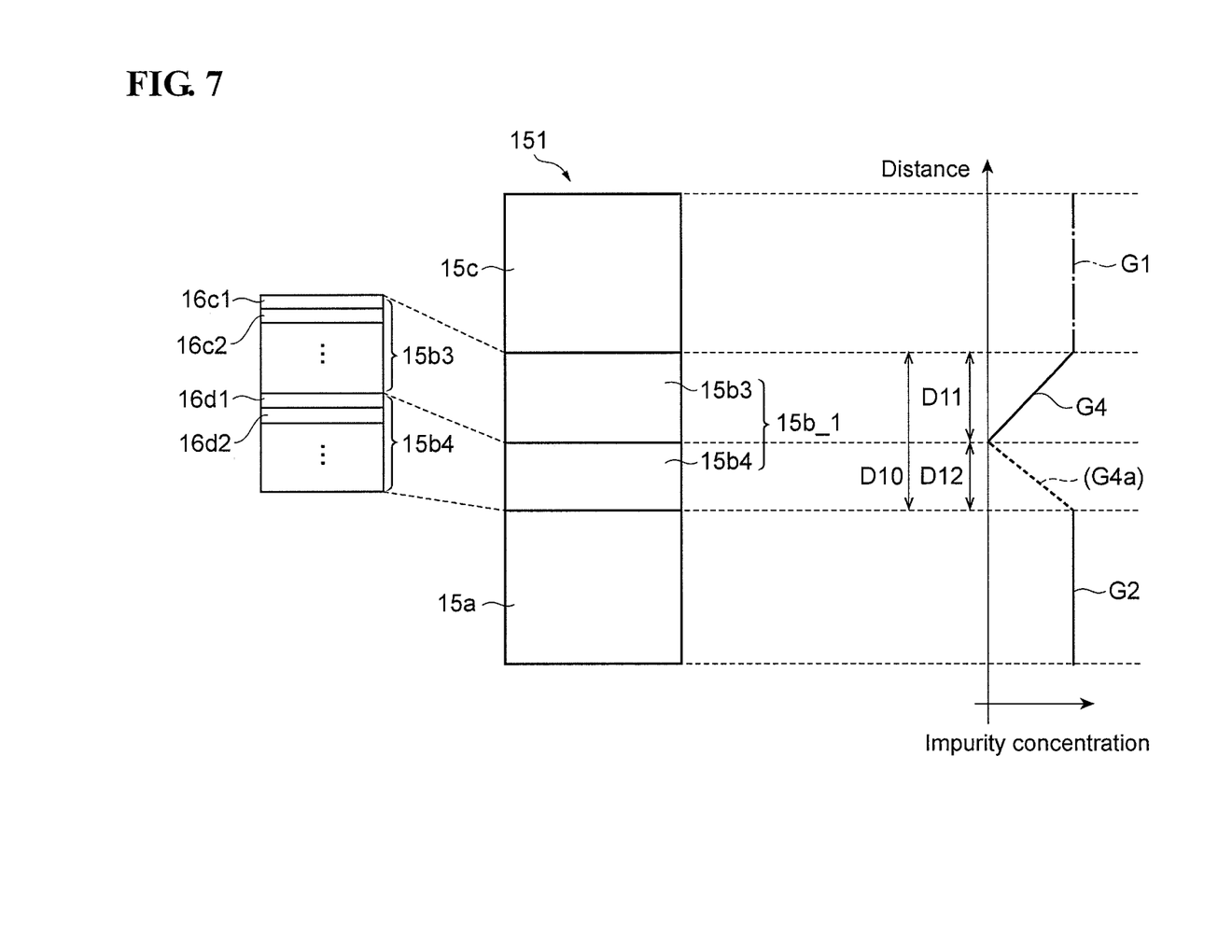
FIG. 7 is a diagram showing another relationship between an optical waveguide and an impurity concentration according to an embodiment.

The mesa portion 15 shown in FIG. 3 may be changed to a mesa portion 151 shown in FIG. 7. The configuration of the mesa portion 151 shown in FIG. 7 is the configuration of a portion corresponding to the optical waveguide F3a. FIG. 7 also shows the impurity concentration corresponding to the above-described configuration shown in FIG. 7.

The mesa portion 151 has a cladding layer 15a, a core layer 15b_1, and a cladding layer 15c. The core layer 15b_1 is formed from a multi quantum well (MQW) structure 15b3 and a multi quantum well (MQW) structure 15b4. The multi quantum well (MQW) structure 15b4 is disposed on the cladding layer 15a. The multi quantum well (MQW) structure 15b3 is disposed on the multi quantum well (MQW) structure 15b4. The cladding layer 15c is disposed on the multi quantum well (MQW) structure 15b3.

The cladding layer 15a is in contact with the multi quantum well (MQW) structure 15b4. The multi quantum well (MQW) structure 15b4 is in contact with the multi quantum well (MQW) structure 15b3. The multi quantum well (MQW) structure 15b3 is in contact with the cladding layer 15c.

The thickness D11 of the multi quantum well (MQW) structure 15b3 is within the range of one-third or more and two-thirds or less of the thickness D10 of the core layer 15b_1. The thickness D12 of the multi quantum well (MQW) structure 15b4 is within the range of one-third or more and two-thirds or less of the thickness D10 of the core layer 15b_1. The thickness D10 of the core layer 15b_1 is the total thickness of the thickness D11 and the thickness D12.

The multi quantum well (MQW) structure 15b3 is formed from a semiconductor layer doped with a first conductivity type impurity. The multi quantum well (MQW) structure 15b4 is formed from an i-type semiconductor layer in which no impurity is intentionally doped. The multi quantum well (MQW) structure 15b3 has a plurality of barrier layers 16c1 doped with a first conductivity type impurity and a plurality of well layers 16c2 doped with a first conductivity type impurity. The multi quantum well (MQW) structure 15b4 has a plurality of i-type barrier layers 16d1 and a plurality of i-type well layers 16d2.

The impurity concentration in the mesa portion 151 is indicated by a graph G1, a graph G2, and a graph G4 shown in FIG. 7. The graph G4 indicates a first conductivity type impurity concentration in the multi quantum well (MQW) structure 15b3.

The average value of the concentration of the first conductivity type impurity added to the multi quantum well (MQW) structure 15b3 is within the range of $5 \times 10^{16}$ cm$^{-3}$ or more and $5 \times 10^{17}$ cm$^{-3}$ or less. The concentration of the first conductivity type impurity contained in the multi quantum well (MQW) structure 15b3 increases as the distance from the cladding layer 15c decreases. The multi quantum well (MQW) structure 15b4 is formed from an i-type semiconductor layer and, therefore, an impurity is not doped intentionally.

The multi quantum well (MQW) structure 15b4 may be formed from a semiconductor layer doped with a second conductivity type impurity and the multi quantum well (MQW) structure 15b3 may be formed from an i-type semiconductor layer. In this case, second conductivity type impurities are added to both the barrier layers 16d1 and the well layers 16d2. On the other hand, both the barrier layers 16c1 and the well layers 16c2 are formed from i-type semiconductor layers in which no impurity is intentionally doped. When the multi quantum well (MQW) structure 15b4 is formed from a semiconductor layer doped with a second conductivity type impurity and the multi quantum well (MQW) structure 15b3 is formed from an i-type semiconductor layer, the impurity concentration in the mesa portion 151 is indicated by the graph G1, the graph G2, and a graph G4a shown in FIG. 7. The graph G4a indicates a second conductivity type impurity concentration in the multi quantum well (MQW) structure 15b4. The average value of the concentration of the second conductivity type impurity added to the multi quantum well (MQW) structure 15b4 is within the range of $5 \times 10^{16}$ cm$^{-3}$ or more and $5 \times 10^{17}$ cm$^{-3}$ or less. The concentration of the second conductivity type impurity contained in the multi quantum well (MQW) structure 15b4 increases as the distance from the cladding layer 15a decreases. The multi quantum well (MQW) structure 15b3 is formed from an i-type semiconductor layer and, therefore, an impurity is not doped intentionally.

Next, the operations and the advantages of Modified example 1 will be described. Modified example 1 exerts the operations and the advantages of the above-described semiconductor optical modulator 1 according to the embodiment. Modified example 1 further exerts the following operations and advantages. When the multi quantum well (MQW) structure 15b3 is formed from a first conductivity type semiconductor and the multi quantum well (MQW) structure 15b4 is formed from an i-type semiconductor layer, a depletion region is generated, where a starting point is in between the first conductivity type multi quantum well (MQW) structure 15b3 and the second conductivity type cladding layer 15c. At this time, a gradient is provided to the impurity concentration in such a way that the impurity concentration increases toward this starting point. In this case, the multi quantum well (MQW) structure 15b3 is depleted almost completely. Meanwhile, when the multi quantum well (MQW) structure 15b4 is formed from a second conductivity type semiconductor layer and the multi quantum well (MQW) structure 15b3 is formed from an i-type semiconductor layer, a depletion region is generated, where a starting point is in between the second conductivity type multi quantum well (MQW) structure 15b4 and the first conductivity type cladding layer 15a. At this time, a gradient is provided to the impurity concentration in such a way that the impurity concentration increases toward this starting point. In this case, the multi quantum well (MQW) structure 15b4 can be depleted almost completely.

Modified Example 2

Figure 8:
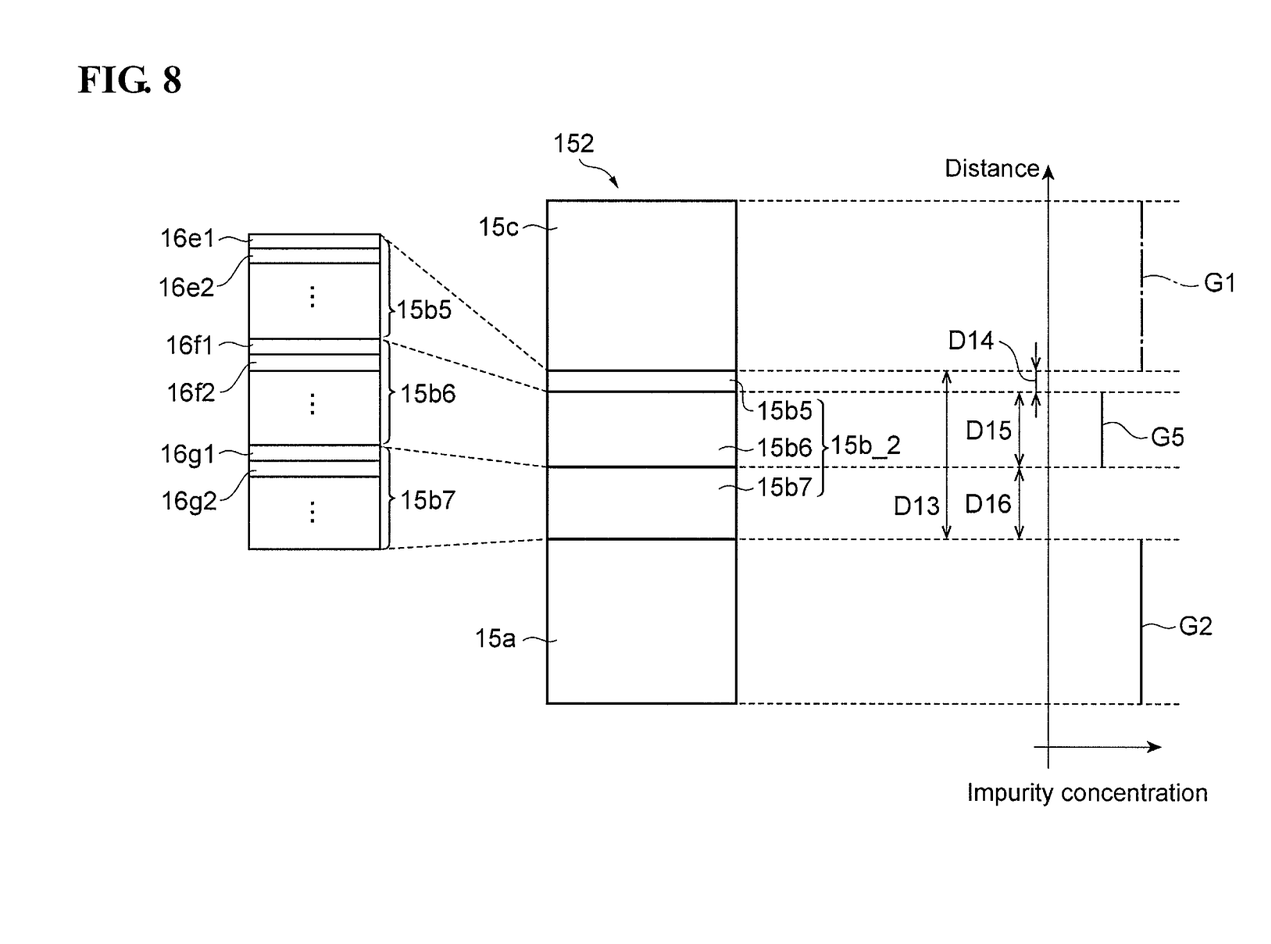
FIG. 8 is a diagram showing another relationship between an optical waveguide and an impurity concentration according to an embodiment.

The mesa portion 15 shown in FIG. 3 may be changed to a mesa portion 152 shown in FIG. 8. The configuration of the mesa portion 152 shown in FIG. 8 is the configuration of a portion corresponding to the optical waveguide F3a. FIG. 8 also shows the impurity concentration corresponding to the above-described configuration shown in FIG. 8.

The mesa portion 152 has a cladding layer 15a, a core layer 15b_2, and a cladding layer 15c. The core layer 15b_2 is formed from a multi quantum well (MQW) structure 15b5, a multi quantum well (MQW) structure 15b6, and a multi quantum well (MQW) structure 15b7. The multi quantum well (MQW) structure 15b7 is disposed on the cladding layer 15a. The multi quantum well (MQW) structure 15b6 is disposed on the multi quantum well (MQW) structure 15b7. The multi quantum well (MQW) structure 15b5 is disposed on the multi quantum well (MQW) structure 15b6. The cladding layer 15c is disposed on the multi quantum well (MQW) structure 15b5.

The cladding layer 15a is in contact with the multi quantum well (MQW) structure 15b7. The multi quantum well (MQW) structure 15b7 is in contact with the multi quantum well (MQW) structure 15b6. The multi quantum well (MQW) structure 15b6 is in contact with the multi quantum well (MQW) structure 15b5. The multi quantum well (MQW) structure 15b5 is in contact with the cladding layer 15c.

The total thickness of the thickness D14 of the multi quantum well (MQW) structure 15b5 and the thickness D16 of the multi quantum well (MQW) structure 15b7 is within the range of one-third or more and two-thirds or less of the thickness D13 of the core layer 15b_2. The thickness D15 of the multi quantum well (MQW) structure 15b6 is within the range of one-third or more and two-thirds or less of the thickness D13 of the core layer 15b_2. The thickness D13 of the core layer 15b_2 is the total thickness of the thickness D14, the thickness D15, and the thickness D16.

Both the multi quantum well (MQW) structure 15b5 and the multi quantum well (MQW) structure 15b7 are formed from i-type semiconductor layers. Meanwhile, the multi quantum well (MQW) structure 15b6 is formed from a first conductivity type semiconductor layer. The multi quantum well (MQW) structure 15b5 has a plurality of i-type barrier layers 16e1 and a plurality of i-type well layers 16e2. The multi quantum well (MQW) structure 15b6 has a plurality of barrier layers 16f1 doped with a first conductivity type impurity and a plurality of well layers 16f2 doped with a first conductivity type impurity. The multi quantum well (MQW) structure 15b7 has a plurality of i-type barrier layers 16g1 and a plurality of i-type well layers 16g2.

The impurity concentration in the mesa portion 152 is indicated by a graph G1, a graph G2, and a graph G5 shown in FIG. 8. The graph G5 indicates a first conductivity type impurity concentration in the multi quantum well (MQW) structure 15b6.

The average value of the concentration of the first conductivity type impurity added to the multi quantum well (MQW) structure 15b6 is within the range of $5 \times 10^{16}$ cm$^{-3}$ or more and $5 \times 10^{17}$ cm$^{-3}$ or less. Both the multi quantum well (MQW) structure 15b5 and the multi quantum well (MQW) structure 15b7 are formed from i-type semiconductor layers and, therefore, an impurity is not doped intentionally.

The thickness D14 is smaller than the thickness D16. Therefore, the multi quantum well (MQW) structure 15b6 is disposed close to the second conductivity type cladding layer 15c in the core layer 15b_2.

The multi quantum well (MQW) structure 15b6 may be formed from a semiconductor layer doped with a second conductivity type impurity. In this case, second conductivity type impurities are added to both the barrier layers 16f1 and the well layers 16f2. On the other hand, all the barrier layers 16e1, the well layers 16e2, the barrier layers 16g1, and the well layers 16g2 are formed from i-type semiconductor layers in which no impurity is intentionally doped. When the multi quantum well (MQW) structure 15b6 is formed from a semiconductor layer doped with a second conductivity type impurity, the impurity concentration in the mesa portion 152 is indicated by the graph G1, the graph G2, and the graph G5 shown in FIG. 8. The average value of the concentration of the second conductivity type impurity added to the multi quantum well (MQW) structure 15b6 is within the range of $5 \times 10^{16}$ cm$^{-3}$ or more and $5 \times 10^{17}$ cm$^{-3}$ or less. Both the multi quantum well (MQW) structure 15b5 and the multi quantum well (MQW) structure 15b7 are formed from i-type semiconductor layers and, therefore, an impurity is not doped intentionally. The thickness D16 is smaller than the thickness D14. Therefore, the second conductivity type multi quantum well (MQW) structure 15b6 is disposed close to the first conductivity type cladding layer 15a in the core layer 15b_2.

Next, the operations and the advantages of Modified example 2 will be described. Modified example 2 exerts the operations and the advantages of the above-described semiconductor optical modulator 1 according to the embodiment. Modified example 2 further exerts the following operations and advantages. When the multi quantum well (MQW) structure 15b6 is made from a semiconductor layer doped with a first conductivity type impurity, the i-type multi quantum well (MQW) structure 15b5 having a relatively small film thickness is disposed between the multi quantum well (MQW) structure 15b6 and the cladding layer 15c. In this case, the thickness of the i-type multi quantum well (MQW) structure 15b5 is relatively small. Therefore, a depletion region, in which a change in the refractive index can occur sufficiently, can be generated between the multi quantum well (MQW) structure 15b5 and the cladding layer 15c. Meanwhile, when the multi quantum well (MQW) structure 15b6 is made from a semiconductor layer doped with a second conductivity type impurity, the i-type multi quantum well (MQW) structure 15b7 having a relatively small film thickness is disposed between the cladding layer 15a and the multi quantum well (MQW) structure 15b6. In this case, the thickness of the i-type multi quantum well (MQW) structure 15b7 is relatively small. Therefore, a depletion region, in which a change in the refractive index can occur sufficiently, can be generated between the cladding layer 15a and the multi quantum well (MQW) structure 15b7. In addition, as the total thickness of the i-type multi quantum well (MQW) structure 15b5 and the i-type multi quantum well (MQW) structure 15b7 increases, the optical loss and the capacitance are reduced. On the other hand, an increase in a switching voltage is induced.

Modified Example 3

Figure 9:
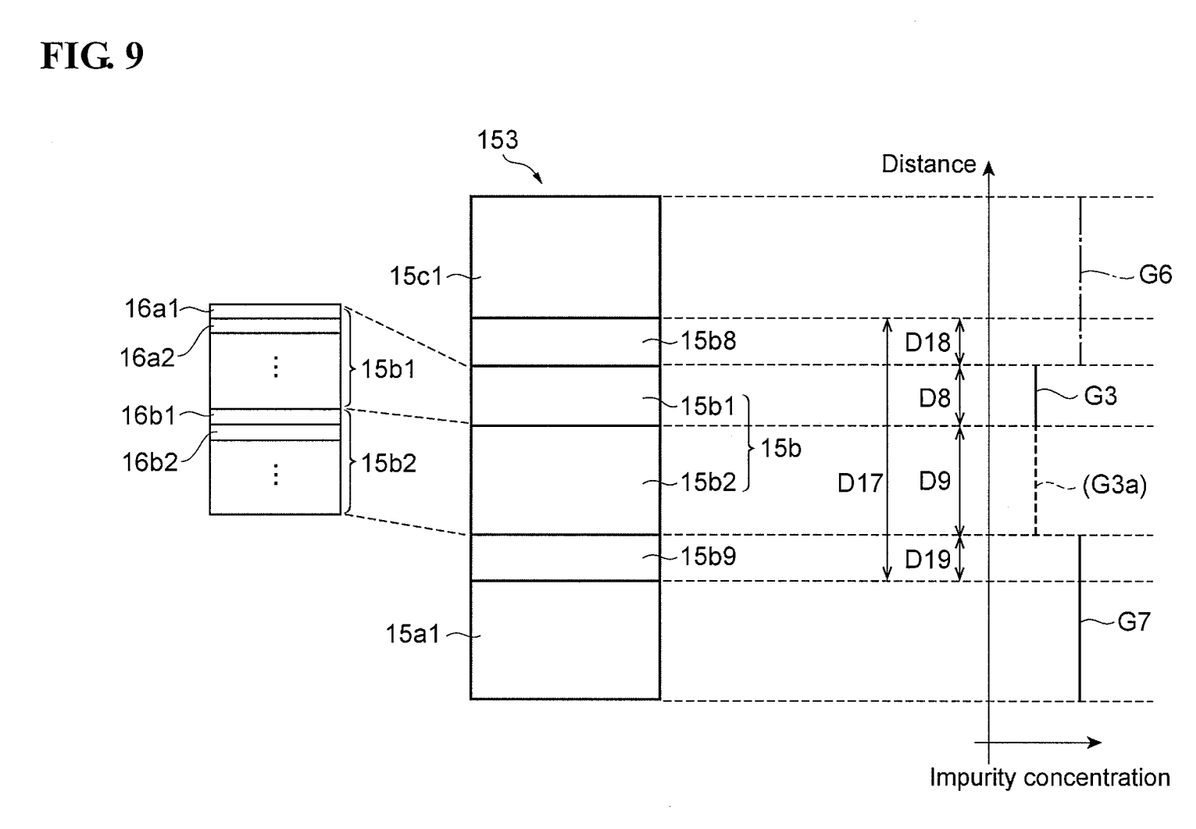
FIG. 9 is a diagram showing another relationship between an optical waveguide and an impurity concentration according to an embodiment.

The mesa portion 15 shown in FIG. 3 may be changed to a mesa portion 153 shown in FIG. 9. The configuration of the mesa portion 153 shown in FIG. 9 is the configuration of a portion corresponding to the optical waveguide F3a. FIG. 9 also shows the impurity concentration corresponding to the above-described configuration shown in FIG. 9.

The mesa portion 153 has a cladding layer 15a1, an optical confinement layer 15b9, a core layer 15b, an optical confinement layer 15b8, and a cladding layer 15c1. The optical confinement layer 15b9 is disposed on the cladding layer 15a1. The multi quantum well (MQW) structure 15b2 is disposed on the optical confinement layer 15b9. The multi quantum well (MQW) structure 15b1 is disposed on the multi quantum well (MQW) structure 15b2. The optical confinement layer 15b8 is disposed on the multi quantum well (MQW) structure 15b1. The cladding layer 15c1 is disposed on the optical confinement layer 15b8. The optical confinement layer 15b8 is disposed between the cladding layer 15c1 and the core layer 15b. The optical confinement layer 15b9 is disposed between the cladding layer 15a1 and the core layer 15b.

The cladding layer 15a1 is in contact with the optical confinement layer 15b9. The optical confinement layer 15b9 is in contact with the multi quantum well (MQW) structure 15b2. The multi quantum well (MQW) structure 15b2 is in contact with the multi quantum well (MQW) structure 15b1. The multi quantum well (MQW) structure 15b1 is in contact with the optical confinement layer 15b8. The optical confinement layer 15b8 is in contact with the cladding layer 15c1. The optical confinement layer 15b8 has a refractive index higher than the refractive index of the cladding layer 15c1. The optical confinement layer 15b9 has a refractive index higher than the refractive index of the cladding layer 15a1.

The impurity concentration in the mesa portion 153 is indicated by a graph G3, a graph G6, and a graph G7 shown in FIG. 9. The graph G6 indicates a second conductivity type impurity concentration in the cladding layer 15c1 and the optical confinement layer 15b8. The graph G7 indicates a first conductivity type impurity concentration in the cladding layer 15a1 and the optical confinement layer 15b9. The graph G3 indicates a first conductivity type impurity concentration in the multi quantum well (MQW) structure 15b1. The average value of the concentration of the first conductivity type impurity added to the multi quantum well (MQW) structure 15b1 is within the range of $5 \times 10^{16}$ cm$^{-3}$ or more and $5 \times 10^{17}$ cm$^{-3}$ or less. The multi quantum well (MQW) structure 15b2 is formed from an i-type semiconductor layer and, therefore, an impurity is not doped intentionally.

The multi quantum well (MQW) structure 15b2 may be formed from a semiconductor layer doped with a second conductivity type impurity and the multi quantum well (MQW) structure 15b1 may be formed from an i-type semiconductor layer. In this case, second conductivity type impurities are added to both the barrier layers 16b1 and the well layers 16b2. On the other hand, both the barrier layers 16a1 and the well layers 16a2 are formed from i-type semiconductor layers. When the multi quantum well (MQW) structure 15b2 is formed from a semiconductor layer doped with a second conductivity type impurity and the multi quantum well (MQW) structure 15b1 is formed from an i-type semiconductor layer, the impurity concentration in the mesa portion 153 is indicated by a graph G3a, the graph G6, and the graph G7 shown in FIG. 9. The graph G3a indicates a second conductivity type impurity concentration in the multi quantum well (MQW) structure 15b2. The average value of the concentration of the second conductivity type impurity added to the multi quantum well (MQW) structure 15b2 is within the range of $5 \times 10^{16}$ cm$^{-3}$ or more and $5 \times 10^{17}$ cm$^{-3}$ or less. The multi quantum well (MQW) structure 15b1 is formed from an i-type semiconductor layer and, therefore, an impurity is not doped intentionally. Both the optical confinement layer 15b8 and the optical confinement layer 15b9 may be any one of InGaAsP and AlGaInAs.

Next, the operations and the advantages of Modified example 3 will be described. Modified example 3 exerts the operations and the advantages of the above-described semiconductor optical modulator 1 according to the embodiment. Modified example 3 further exerts the following operations and advantages. As the optical confinement into the core layer 15b becomes strong, the amount of phase modulation increases relative to the same amount of change in the refractive index. Therefore, it is preferable that the core layer 15b be disposed between the optical confinement layer 15b9 and the optical confinement layer 15b8.

Up to this point, the principle of the present invention has been illustrated and explained with reference to preferred embodiments. However, it is to be understood that changes in arrangements and details of the present invention without departing from the principle will be apparent to one skilled in the art. The present invention is not limited to the specific configurations disclosed in the present embodiments. Therefore, the present invention covers various changes and modifications on the basis of the spirit of the invention and the scope as defined in the appended claims.

What is claimed is:

1. A semiconductor optical modulator comprising:
    a substrate; and
    a mesa portion having a first cladding layer disposed on the substrate, a core layer disposed on the first cladding layer, and a second cladding layer disposed on the core layer, the first cladding layer having a first conductivity type, the second cladding layer having a second conductivity type reverse to the first conductivity type,
    wherein the core layer includes a first multi quantum well structure made from a first conductivity type semiconductor layer and a second multi quantum well structure made from an i-type semiconductor layer in which no impurity is intentionally doped,
    the second multi quantum well structure is disposed on the first cladding layer,
    the first multi quantum well structure is disposed on the second multi quantum well structure, and
    the second cladding layer is disposed on the first multi quantum well structure.

2. The semiconductor optical modulator according to claim 1, wherein the first multi quantum well structure has an impurity concentration increasing as the distance from the second cladding layer decreases.

3. The semiconductor optical modulator according to claim 1,
    wherein the mesa portion further has a first optical confinement layer and a second optical confinement layer,
    the first optical confinement layer is disposed between the first cladding layer and the core layer,
    the first optical confinement layer has a refractive index higher than the refractive index of the first cladding layer,
    the second optical confinement layer is disposed between the second cladding layer and the core layer, and
    the second optical confinement layer has a refractive index higher than the refractive index of the second cladding layer.

4. The semiconductor optical modulator according to claim 1, wherein the first multi quantum well structure has an impurity concentration, the average value of the impurity concentration being within the range of $5 \times 10^{16}$ cm$^{-3}$ or more and $5 \times 10^{17}$ cm$^{-3}$ or less.

5. The semiconductor optical modulator according to claim 1, wherein the first multi quantum well structure has a thickness within the range of one-third or more and two-thirds or less of the thickness of the core layer.

6. The semiconductor optical modulator according to claim 1, wherein the second multi quantum well structure has a thickness within the range of one-third or more and two-thirds or less of the thickness of the core layer.

7. The semiconductor optical modulator according to claim 1,
    wherein the core layer further includes a third multi quantum well structure made from an i-type semiconductor layer in which no impurity is intentionally doped,
    the third multi quantum well structure is disposed between the first multi quantum well structure and the second cladding layer, and
    the third multi quantum well structure has a thickness smaller than the thickness of the second multi quantum well structure.

8. The semiconductor optical modulator according to claim 7, wherein the total thickness of the second multi quantum well structure and the third multi quantum well structure is within the range of one-third or more and two-thirds or less of the thickness of the core layer.

9. The semiconductor optical modulator according to claim 1, further comprising an electrode disposed on the mesa portion.

10. A semiconductor optical modulator comprising:
a substrate; and
a mesa portion having a first cladding layer disposed on the substrate, a core layer disposed on the first cladding layer, and a second cladding layer disposed on the core layer, the first cladding layer having a first conductivity type, the second cladding layer having a second conductivity type reverse to the first conductivity type,
wherein the core layer includes a first multi quantum well structure made from a second conductivity type semiconductor layer and a second multi quantum well structure made from an i-type semiconductor layer in which no impurity is intentionally doped,
the first multi quantum well structure is disposed on the first cladding layer,
the second multi quantum well structure is disposed on the first multi quantum well structure, and
the second cladding layer is disposed on the second multi quantum well structure.

11. The semiconductor optical modulator according to claim 10, wherein the first multi quantum well structure has an impurity concentration increasing as the distance from the first cladding layer decreases.

12. The semiconductor optical modulator according to claim 10,
wherein the mesa portion further has a first optical confinement layer and a second optical confinement layer,
the first optical confinement layer is disposed between the first cladding layer and the core layer,
the first optical confinement layer has a refractive index higher than the refractive index of the first cladding layer,
the second optical confinement layer is disposed between the second cladding layer and the core layer, and
the second optical confinement layer has a refractive index higher than the refractive index of the second cladding layer.

13. The semiconductor optical modulator according to claim 10, wherein the first multi quantum well structure has a thickness within the range of one-third or more and two-thirds or less of the thickness of the core layer.

14. The semiconductor optical modulator according to claim 10,
wherein the core layer further includes a third multi quantum well structure made from an i-type semiconductor layer in which no impurity is intentionally doped,
the third multi quantum well structure is disposed between the first cladding layer and the first multi quantum well structure, and
the third multi quantum well structure has a thickness smaller than the thickness of the second multi quantum well structure.

15. The semiconductor optical modulator according to claim 14, wherein the total thickness of the second multi quantum well structure and the third multi quantum well structure is within the range of one-third or more and two-thirds or less of the thickness of the core layer.

* * * * *